(12) United States Patent
Pelletier et al.

(10) Patent No.: US 12,526,753 B2
(45) Date of Patent: Jan. 13, 2026

(54) METHODS FOR SUPPLEMENTARY UPLINK ACCESS IN WIRELESS SYSTEMS

(71) Applicant: InterDigital Patent Holdings, Inc., Wilmington, DE (US)

(72) Inventors: Ghyslain Pelletier, Montreal (CA); Mouna Hajir, Montreal (CA); Faris Alfarhan, Montreal (CA); J. Patrick Tooher, Montreal (CA); Paul Marinier, Brossard (CA); Martino M. Freda, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 64 days.

(21) Appl. No.: 16/763,628

(22) PCT Filed: Nov. 15, 2018

(86) PCT No.: PCT/US2018/061334
§ 371 (c)(1),
(2) Date: May 13, 2020

(87) PCT Pub. No.: WO2019/099709
PCT Pub. Date: May 23, 2019

(65) Prior Publication Data
US 2020/0281022 A1 Sep. 3, 2020

Related U.S. Application Data

(60) Provisional application No. 62/591,482, filed on Nov. 28, 2017, provisional application No. 62/586,537, filed on Nov. 15, 2017.

(51) Int. Cl.
*H04W 52/36* (2009.01)
*H04W 72/0453* (2023.01)
*H04W 74/00* (2009.01)

(52) U.S. Cl.
CPC ..... *H04W 52/367* (2013.01); *H04W 72/0453* (2013.01); *H04W 74/00* (2013.01)

(58) Field of Classification Search
CPC ........... H04W 74/0833; H04W 52/367; H04W 72/0453
See application file for complete search history.

(56) References Cited

U.S. PATENT DOCUMENTS 8,767,585 B2  7/2014  Pelletier et al.
9,253,802 B2  2/2016  Pelletier et al.
(Continued)

FOREIGN PATENT DOCUMENTS

CN   101505522 A   8/2009
CN   102150466 A   8/2011
(Continued)

OTHER PUBLICATIONS

CMCC, "Considerations on support of supplementary uplink frequency", 3GPP R2-1709093, Aug. 21-25, 2017. (Year: 2017).*
(Continued)

*Primary Examiner* — Chuong M Nguyen
(74) *Attorney, Agent, or Firm* — Flaster Greenberg, P.C.

(57) ABSTRACT

A method performed by a WTRU may comprise transmitting, to a gNB, a first random access preamble on a first physical random access channel (PRACH) resource of a first uplink (UL) carrier and determining that the transmission on the first PRACH resource is unsuccessful. The method may further comprise determining that a maximum number of random access retransmissions on the first UL carrier is met and in response, the WTRU may transmit, to the gNB on a second UL carrier, a third random access preamble on a third PRACH resource. The WTRU may determine an RA-RNTI
(Continued)

for a second UL carrier at least in part by a carrier offset. The WTRU may monitor for a random access response (RAR) based on the RA-RNTI.

9 Claims, 11 Drawing Sheets

(56) References Cited

U.S. PATENT DOCUMENTS

| | | | |
|---|---|---|---|
| 2010/0130219 | A1 | 5/2010 | Cave et al. |
| 2010/0296467 | A1 | 11/2010 | Pelletier et al. |
| 2013/0279343 | A1 | 10/2013 | Jeong et al. |
| 2014/0086173 | A1 | 3/2014 | Sadeghi et al. |
| 2014/0233452 | A1 | 8/2014 | Kim et al. |
| 2014/0349712 | A1* | 11/2014 | Shukla ................ H04W 52/50 455/571 |
| 2015/0223178 | A1 | 8/2015 | Pietraski et al. |
| 2016/0094975 | A1* | 3/2016 | Sheng ................ H04L 41/0654 370/216 |
| 2016/0270121 | A1* | 9/2016 | Bergström ........ H04W 74/0833 |
| 2017/0251460 | A1 | 8/2017 | Agiwal et al. |
| 2017/0366996 | A1 | 12/2017 | Park et al. |
| 2018/0084550 | A1 | 3/2018 | Chen et al. |
| 2018/0176937 | A1 | 6/2018 | Chen et al. |
| 2018/0206271 | A1* | 7/2018 | Chatterjee ............. H04L 5/0053 |
| 2018/0242367 | A1 | 8/2018 | Kim et al. |
| 2018/0279380 | A1 | 9/2018 | Jung et al. |
| 2019/0132857 | A1* | 5/2019 | Babaei ............. H04W 72/0453 |
| 2020/0008155 | A1* | 1/2020 | Li ........................ H04W 52/10 |
| 2020/0037345 | A1* | 1/2020 | Ryoo ................ H04W 74/0833 |
| 2020/0128564 | A1* | 4/2020 | Takeda .................. H04W 24/10 |
| 2020/0178261 | A1* | 6/2020 | Loffe ..................... H04L 1/1812 |
| 2020/0221508 | A1 | 7/2020 | Huang et al. |
| 2020/0274750 | A1* | 8/2020 | Yi ....................... H04J 11/0076 |
| 2020/0281022 | A1 | 9/2020 | Pelletier et al. |
| 2020/0305200 | A1* | 9/2020 | Jiang ................. H04W 36/0072 |

FOREIGN PATENT DOCUMENTS

| | | |
|---|---|---|
| CN | 102440057 A | 5/2012 |
| CN | 103299699 A | 9/2013 |
| CN | 103763784 A | 4/2014 |
| CN | 104039022 A | 9/2014 |
| CN | 104868986 A | 8/2015 |
| CN | 104968055 A | 10/2015 |
| CN | 107006037 A | 8/2017 |
| CN | 107211451 A | 9/2017 |
| JP | 2015084592 A | 4/2015 |
| JP | 2015146633 A | 8/2015 |
| JP | 2021503220 A | 2/2021 |
| WO | WO 2007/024791 A2 | 3/2007 |
| WO | WO 2009/111233 A1 | 9/2009 |
| WO | WO 2010/030935 A3 | 5/2010 |
| WO | WO 2010/124228 A2 | 10/2010 |
| WO | 2011/116242 | 9/2011 |
| WO | 2012154955 A1 | 11/2012 |
| WO | WO 2016/086144 A1 | 6/2016 |
| WO | WO 2016/089146 A1 | 6/2016 |
| WO | 2016117889 A1 | 7/2016 |
| WO | WO 2017/030412 A1 | 2/2017 |
| WO | 2018/085145 | 5/2018 |

OTHER PUBLICATIONS

NEC "RACH Procedure towards SUL carrier", 3GPP R1-1717154, Oct. 9-13, 2017 (Year: 2017).*

Huawei "Discussion on the PRACH for SUL", 3GPP R1-1715716, Sep. 18-21, 2017 (Year: 2017).*

CATT, "Random Access Procedure," 3GPP TSG-RAN WG2 Meeting #NR AH2, R2-1706366, Qingdao, China (Jun. 27-29, 2017).

CMCC, "Considerations on support of supplementary uplink frequency," 3GPP TSG-RAN WG2 Meeting #99, R2-1709093, Berlin, Germany (Aug. 21-25, 2017).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Intel Corporation, "Summary of discussion on RA-RNTI," 3GPP TSG-RAN WG2 #100, R2-1714069, Reno, USA (Nov. 27-Dec. 1, 2017).

Interdigital Inc., "Random Access procedure on SUL," 3GPP TSG-RAN WG2 #100, R2-1712783, Reno, USA (Nov. 27-Dec. 1, 2017).

Interdigital Inc., "Random Access procedure on SUL," 3GPP TSG-RAN WG2 #100, R2-1800517, Vancouver, Canada (Jan. 22-26, 2018).

NTT DOCOMO, Inc., "Discussion on 4-step random access procedure for NR," 3GPP TSG RAN WG1 AH_NR Meeting, R1-1700614, Spokane, USA (Jan. 16-20, 2017).

Qualcomm Incorporated, "Power Ramping and Power Control for RACH Procedure," 3GPP TSG-RAN WG1 Meeting #89AH, R1-1711147 Qingdao, China (Jun. 27-30, 2017).

Qualcomm Incorporated, "Summary of Remaining Details on RACH Procedure," 3GPP TSG-RAN WG1 93, R1-1807747, Busan, Korea (May 21-25, 2018).

Samsung, "Miscellaneous corrections," 3GPP TSG-RAN WG2 NR AH 1807, R2-1810778, Montreal, QC, Canada (Jul. 2-6, 2018).

Third Generation Partnership Project, "Technical Specification Group Radio Access Network; NR; Medium Access Control (MAC) protocol specification (Release 15)," 3GPP TS 38.321 V1.0.0 (Sep. 2017).

Third Generation Partnership Project, "Technical Specification Group Radio Access Network; NR; Medium Access Control (MAC) protocol specification (Release 15)," 3GPP TS 38.321 V15.3.0 (Sep. 2018).

3rd Generation Partnership Project (3GPP); "Calculation of RA-RNTI", Huawei, HiSilcon, R2-1710775, 3GPP TSG-RAN WG2 Meeting #99bis, Prague, Czech Republic, Oct. 9-13, 2017, 4 pages.

3rd Generation Partnership Project (3GPP); "RACH Procedure towards SUL Carrier", NEC, R1-1717154, 3GPP TSG-RAN WG1 Meeting #90bis, Prague, Czech Republic, Oct. 9-13, 2017, 3 pages.

3rd Generation Partnership Project (3GPP); "Discussion on the PRACH for SUL", Huawei, HiSilicon, R1-1715716, 3GPP TSG RAN WG1, Meeting NR#3, Nagoya, Jampan, Sep. 18-21, 2017, 6 pages.

3rd Generation Partnership Project, "Discussion on PRACH and RACH Procedure in Coverage Enhancement Mode", MediaTek Inc., R1-135424, 3GPP TSG-RAN WG1 #75, San Francisco, USA, Nov. 11-15, 2013, 5 pages.

(56) References Cited

OTHER PUBLICATIONS

3rd Generation Partnership Project, "Introduction of new UL Coverage Class CC5 for UL MCL Improvement", Nokia, R6-170212, 3GPP TSG RAN WG6 #4 Hangzhou, P.R. China, May 15-19, 2017, 34 pages.

Choi, et al. "Multichannel Random Access in OFDMA Wireless Networks", Suho Park; Saewoong Bahk,Multichannel random access in OFDMA wireless networks, Mar. 3, 2006, 11 pages.

Hu, et al. "Computer Engineering and Design", vol. 35 No. 11, Nov. 2014, 6 pages.

Third Generation Partnership Project (3GPP), "Remaining Issues on the PRACH for SUL", 3GPP TSG RAN WG1 Meeting 90bis Huawei, HiSilicon, R1-1717901, Oct. 9-13, 2017, 6 pages.

Third Generation Partnership Project (3GPP), "Handling LBT Failures", 3GPP TSG-RAN WG2 #107bis Chongqing, China, Ericsson, R2-1913504, Oct. 14-18, 2019, 8 pages.

Third Generation Partnership Project (3GPP), "On Bandwidth Adaptation", Huawei, HiSilicon, 3GPP TSG RAN WG1 NR Ad-Hoc Meeting, Qingdao, China, Jun. 27-30, 2017, R1-1711424.

Third Generation Partnership Project (3GPP), "Remaining Issues on the PRACH for SUL", Huawei, HiSilicon, 3GPP TSG RAN WG1 Meeting 90bis, Prague, Czech Republic, Oct. 9-13, 2017, R1-1717901.

Third Generation Partnership Project (3GPP), "Report of 3GPP TSG RAN2#99bis Meeting, Prague, Czech Republic", ETSI MCC, 3GPP TSG-RAN WG2 Meeting #100, Reno, Nevada, USA, Nov. 27-Dec. 1, 2017, R2-1712xxx.

Third Generation Partnership Project (3GPP), "SR Failure Handling in NR", Huawei, HiSilicon, 3GPP TSG-RAN2 Meeting #99bis, Prague, Czech Republic, Oct. 9-13, 2017, R2-1710110.

Third Generation Partnership Project (3GPP), "RLM/RLF for Bandwidth Part", Samsung, 3GPP TSG-RAN WG2 #99bis, Prague, Czech, Oct. 9-13, 2017, R2-1711404.

Third Generation Partnership Project (3GPP), "The Impact of Bandwidth Part on RAN2: Overview and Issues", Samsung, 3GPP TSG RAN WG2 #99bis, Prague, Czech Republic, Oct. 9 to 13, 2017, R2-1711595.

Third Generation Partnership Project (3GPP), "Handling LBT Failures", Ericsson, 3GPP TSG-RAN WG2 #107bis, Chongqing, China, Oct. 14-18, 2019, Tdoc R2-1913504, (Revision of R2-1910779).

\* cited by examiner

METHODS FOR SUPPLEMENTARY UPLINK ACCESS IN WIRELESS SYSTEMS

CROSS REFERENCE TO RELATED APPLICATIONS

This application is the U.S. National Stage, under 35 U.S.C. § 371, of International Application No. PCT/US2018/061334 filed Nov. 15, 2018, which claims the benefit of U.S. Provisional Application No. 62/586,537, filed on Nov. 15, 2017 and U.S. Provisional Application No. 62/591,482 filed on Nov. 28, 2017, the contents of which are hereby incorporated by reference herein.

SUMMARY

A method performed by a WTRU may comprise transmitting, to a next generation Node B (gNB), a first random access (RA) preamble on a first physical RA channel (PRACH) resource of a first uplink (UL) carrier. The WTRU may determine that the transmission is unsuccessful and in response, the WTRU may transmit, to the gNB, a second random access preamble on a second PRACH resource on the first UL carrier. If this transmission is unsuccessful, the WTRU may determine whether a maximum number of RA retransmissions on the first UL carrier is met. If so, the WTRU may transmit, to the gNB on a second UL carrier, a third RA preamble on a third PRACH resource. The WTRU may determine an RA-RNTI for the second UL carrier at least in part by a carrier offset. The WTRU may monitor for a random access response (RAR) based on the RA-RNTI. The first UL carrier and second UL carrier may be different UL carriers.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
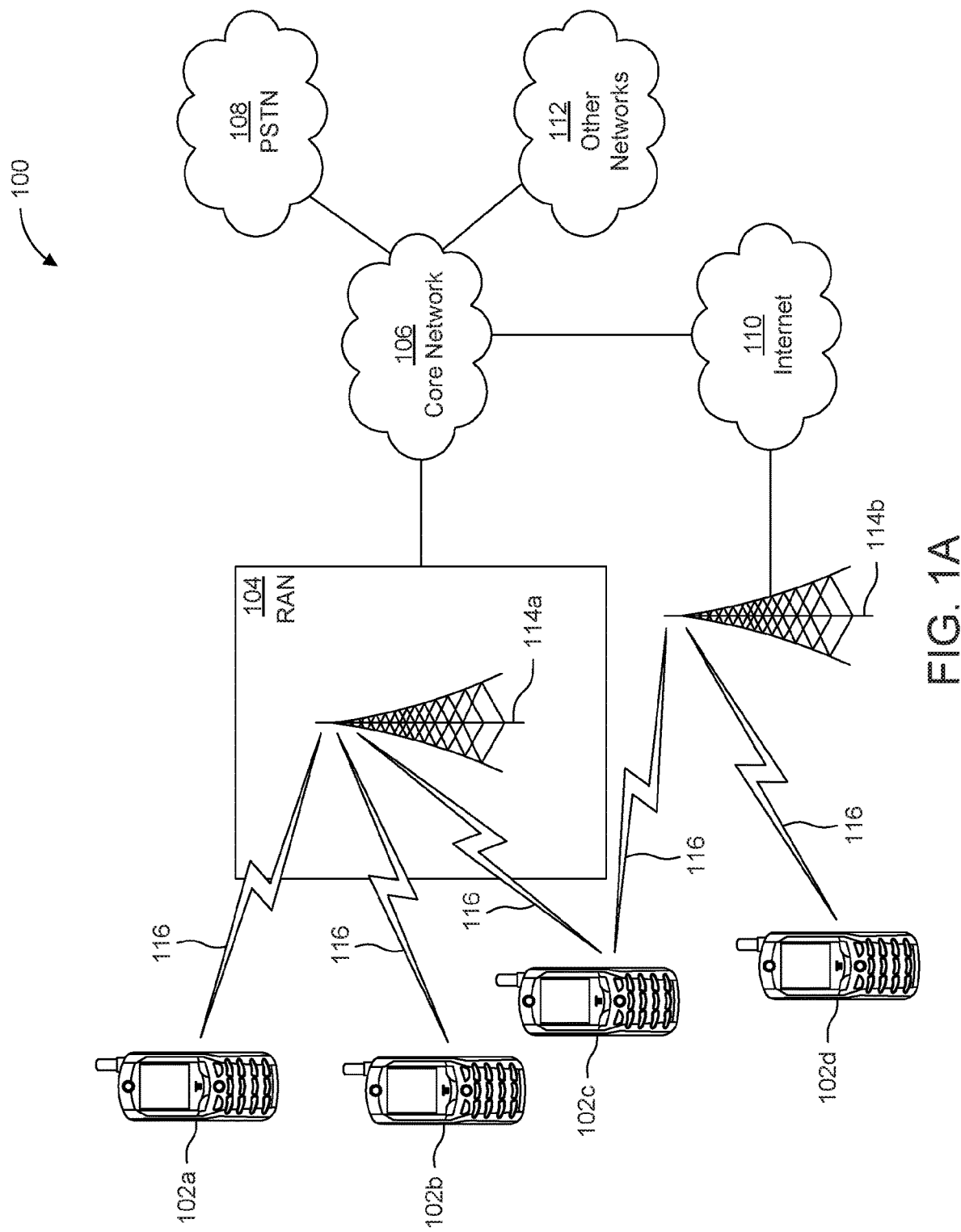
FIG. 1A is a system diagram illustrating an example communications system in which one or more embodiments may be implemented.

FIG. 1A is a diagram illustrating an example communications system 100 in which one or more embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers.

For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
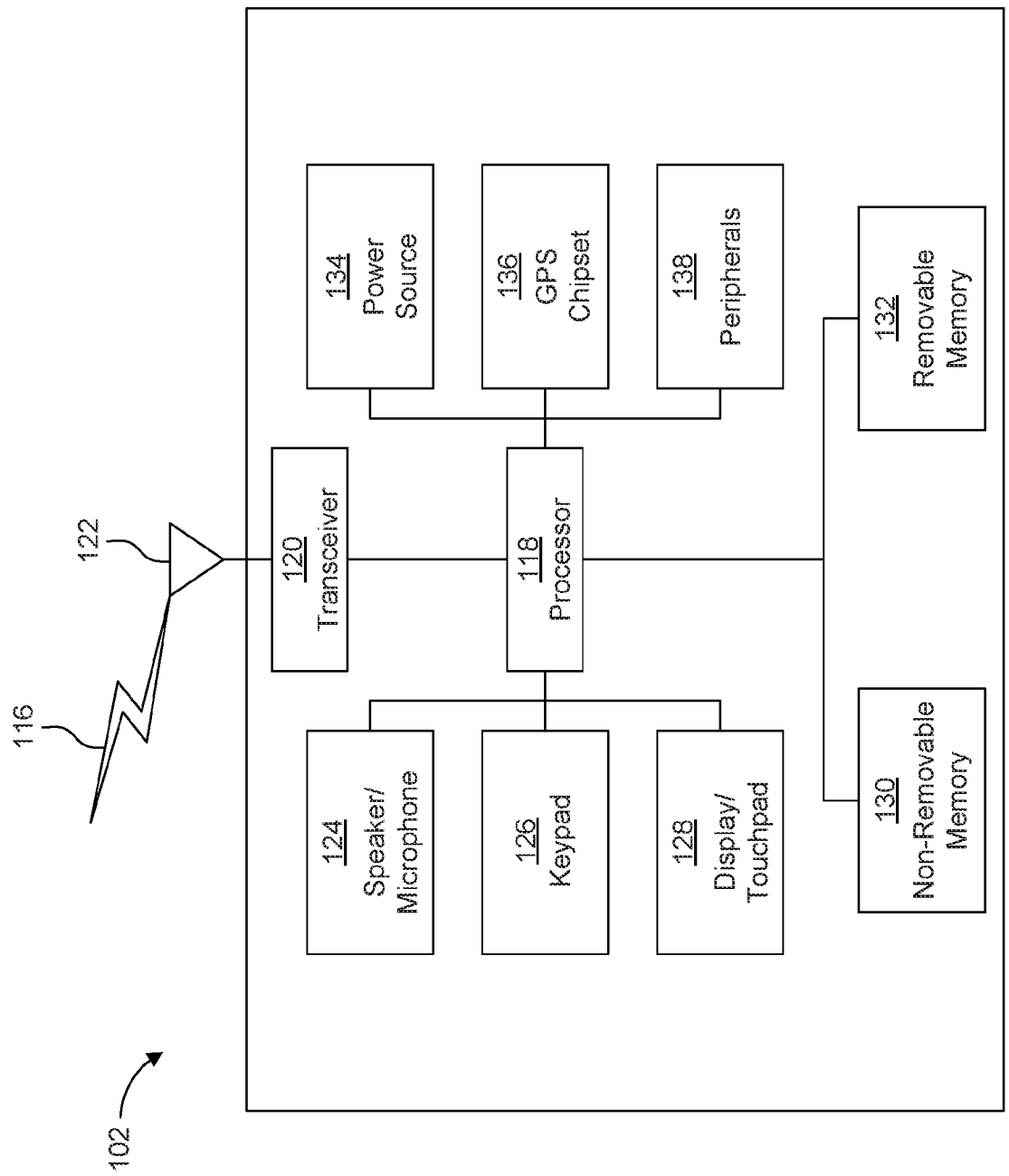
FIG. 1B is a system diagram illustrating an example wireless transmit/receive unit (WTRU) that may be used within the communications system illustrated in FIG. 1A according to an embodiment.
Figure 1C:
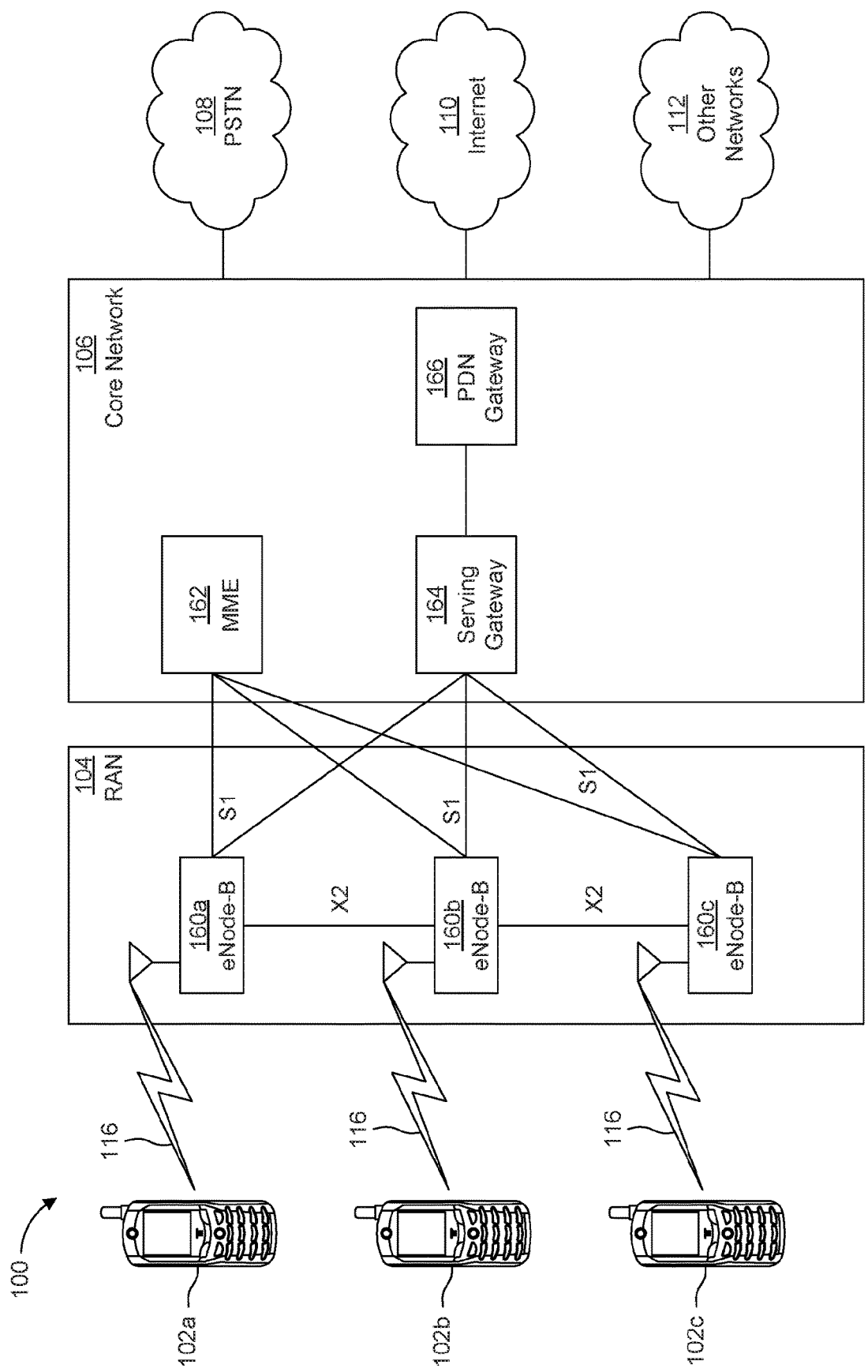
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN. A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
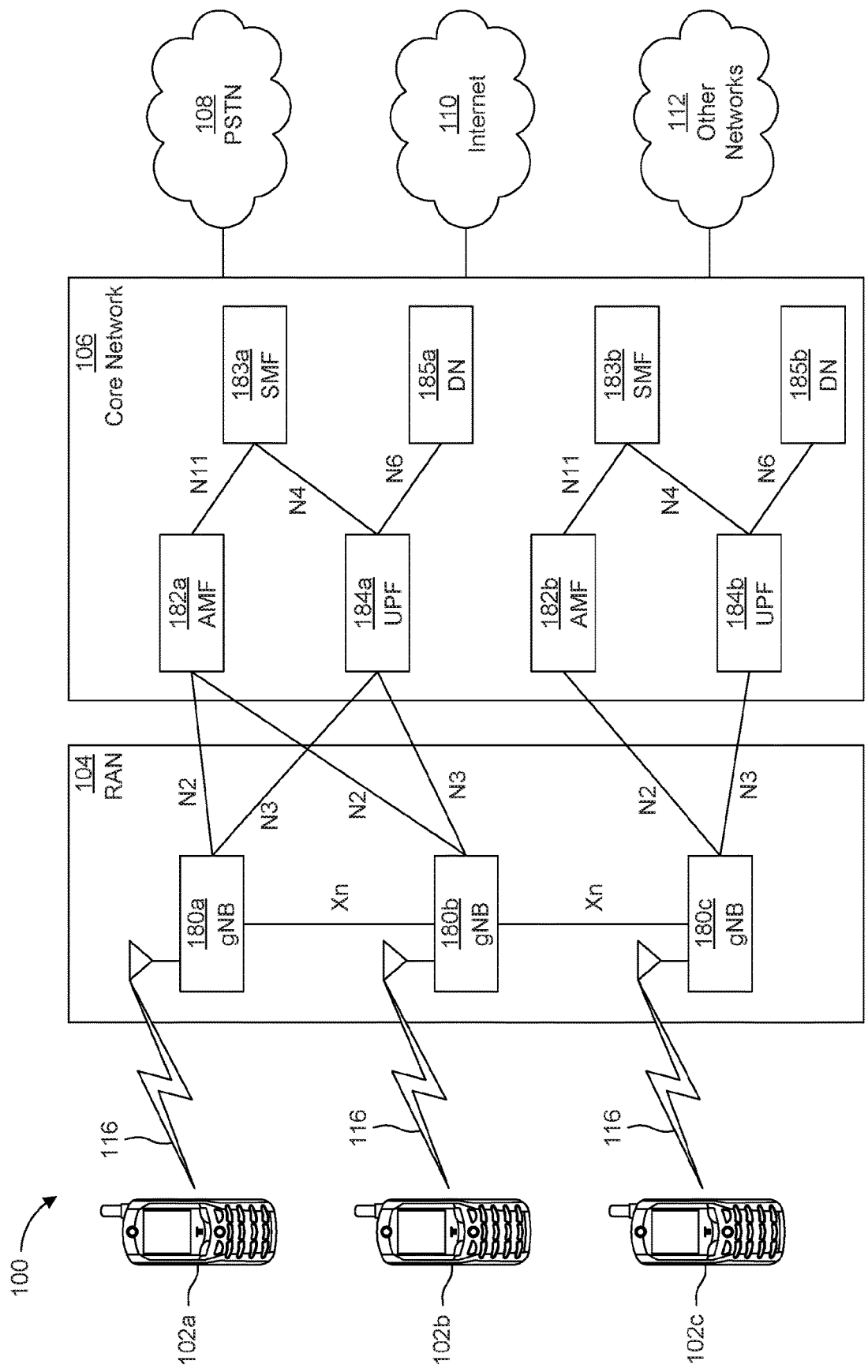
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The following description is for exemplary purposes and is not intended to limit in any way the applicability of methods employed by one or more WTRUs, base stations, eNBs, other devices or the like. Embodiments may relate to alternative wireless technologies, topologies and/or to different technological principles, when applicable or desired. As used herein, the term network may refer to one or more gNBs which may be associated with one or more transmission reception points (TRPs) or other nodes of a radio access network. The network may comprise other elements as illustrated in FIGS. 1A-1D.

Mobile communication technologies are in continuous evolution and are at the doorstep of a fifth incarnation—5G. As with previous generations, new use cases largely contributed in setting requirements for the new radio system. New radio (NR) is a new radio technology being developed for 5G. The access air interface of NR is more flexible as compared to air interfaces of legacy technologies. For example, NR may be capable of supporting multiple radio access technologies (RATs) in both licensed and unlicensed bands.

In an embodiment, a design of a 5G system may correspond at least in part to a NR access technology that meets 5G requirements. In no way shall the embodiments be limited to NR, 5G or any other technology standard, implementation or technology.

It is expected that the 5G air interface will at least enable the following use cases: improved broadband performance (IBB), industrial control and communications (ICC), vehicular applications (V2X) and massive machine-type communications (mMTC). These use cases may be translated into the following requirements for the 5G air interface: support for ultra-low transmission latency (LLC); support for ultra-reliable transmission (URC); and support for MTC operation including narrowband operation.

An air interface latency as low as 1 ms round trip time (RTT) may require support for TTIs in a range of between 100 us and (no larger than) 250 us. Support for ultra-low access latency, for example, the time from initial system access until the completion of the transmission of the first user plane data unit, may be of interest but may be of a lower priority. ICC and V2X may require an end-to-end (e2e) latency of less than 10 ms.

One design consideration of NR implementations includes a transmission reliability that is better than what is possible with legacy LTE systems. For example, a target may be close to 99.999% transmission success and service availability. Another consideration may be support for mobility for speeds in the range of 0-500 km/h. At least IC and V2X may require a packet loss ratio of less than $10e^{-6}$.

The air interface should efficiently support narrowband operation, for example, using less than 200 KHz, extended battery life, for example, up to 15 years of autonomy and minimal communication overhead for small and infrequent data transmissions, for example, a low data rate in the range of 1-100 kbps with access latency of seconds to hours.

OFDM is used as the basic signal format for data transmissions in both LTE and in the Institute for Electrical and Electronic Engineers (IEEE) 802.11 strandards. Essentially, OFDM efficiently divides the spectrum into multiple parallel orthogonal sub-bands called subcarriers. Each subcarrier is shaped using a rectangular window in the time domain leading to sinc-shaped subcarriers in the frequency domain. OFDMA thus requires perfect frequency synchronization and tight management of uplink timing alignment within the duration of the cyclic prefix to maintain orthogonality between signals and to minimize inter-carrier interference. Such tight synchronization may also not be well-suited in a system where a WTRU is connected to multiple access point simultaneously. Additional power reduction is also typically applied to uplink transmissions to ensure compliance with spectral emission requirements in adjacent bands. The need to ensure compliance is of particular relevance in the presence of aggregation of fragmented spectrum for uplink transmissions of a WTRU.

It is acknowledged that some of the shortcomings of conventional OFDM (CP-OFDM) may be addressed by more stringent RF requirements for implementations, and especially when operating using large amount of contiguous spectrum not requiring aggregation. A CP-based OFDM transmission method may also lead to a downlink physical layer for 5G similar to that of legacy systems, for example, modifications would mainly be to pilot signal density and location. Therefore, a 5G Flexible Radio Access Technology (5gFLEX) design may also consider other waveform candidates although conventional OFDM and remains as a potential candidate for 5G systems at least for the downlink.

The 5gFLEX radio access design may be characterized by a high degree of spectrum flexibility that enables deployment in different frequency bands with different characteristics, including different duplex arrangements, different and/or variable sizes of the available spectrum including contiguous and non-contiguous spectrum allocations in the same or different bands. 5gFLEX may also support variable timing aspects including support for multiple TTI lengths and may support asynchronous transmissions.

Both time division duplex (TDD) and frequency division duplex (FDD) duplexing schemes may be supported. For FDD operation, supplemental downlink operation may be supported using spectrum aggregation. FDD operation may support both full-duplex FDD and half-duplex FDD operation. For TDD operation, the DL/UL allocation may be dynamic, for example, it may not be based on a fixed DL/UL frame configuration; rather, the length of a DL or a UL transmission interval may be set per transmission opportunity.

Figure 2:
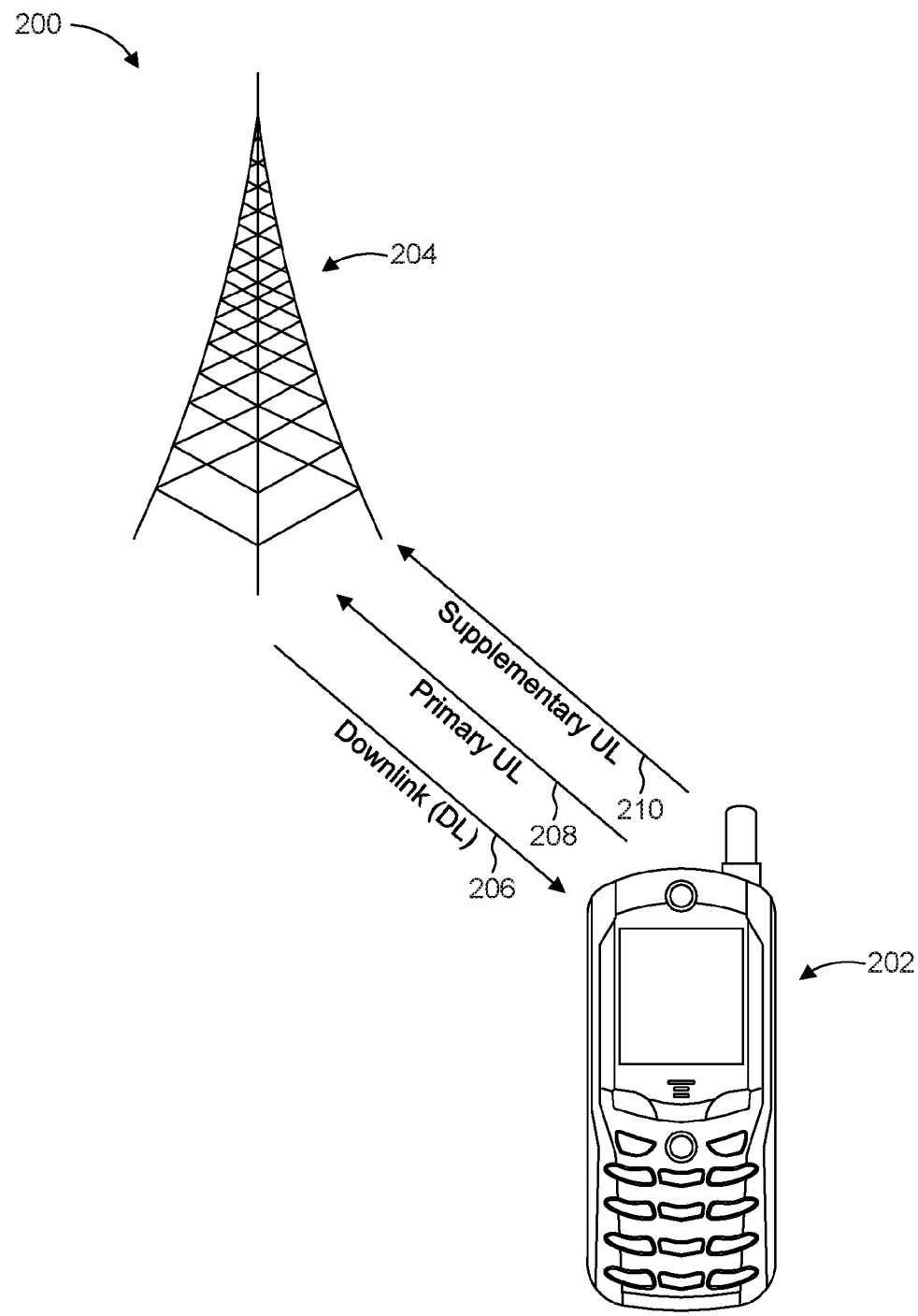
FIG. 2 is an illustration of a plurality of carriers by which a WTRU may use to communicate with a next generation Node B (gNB)

FIG. 2 is an illustration 200 of a WTRU 202 in communication with a gNB 204. The communication with the gNB 204 may encompass communication over a downlink carrier 206, a primary uplink carrier 208 and a supplementary uplink (SUL) carrier 210. The SUL carrier may be configured to operate supplementary to or in addition to the primary uplink carrier 208. The serving cell or gNB 204 may be configured with one or more additional uplink carriers, for example, one or more SUL carriers. In one embodiment, the SUL 210 may be used to extend coverage of a WTRU operating in high frequency, such that the WTRU may perform transmissions on the SUL when configured with a lower frequency band, for example, the primary UL carrier 208. This may be useful when the WTRU moves towards the edge of the coverage of the cell's primary uplink carrier. Additionally, the lower frequency resources may be more reliable as they may be more likely to penetrate objects such as walls. Another potential use for an SUL may be for the provision of specific services, for example, services which provide high throughput and/or an increased need for reliability. In particular, this may be possible if the WTRU is configured to perform transmissions on multiple uplinks in which concerned cells are transmitted to concurrently or near concurrently, for example, in a TDM fashion. As used herein, a primary uplink carrier of a WTRU may be referred as a regular uplink (RUL) carrier. Similarly, the term RUL carrier and normal uplink (NUL) carrier may be used interchangeably.

In one embodiment, SUL may be modeled as a cell with a DL carrier associated with two separate UL carriers. The uplink carrier may consist of or may be comprised of a primary UL carrier located in a high frequency band where the DL carrier is also located, and an SUL carrier which may be in a lower frequency band.

Figure 3:
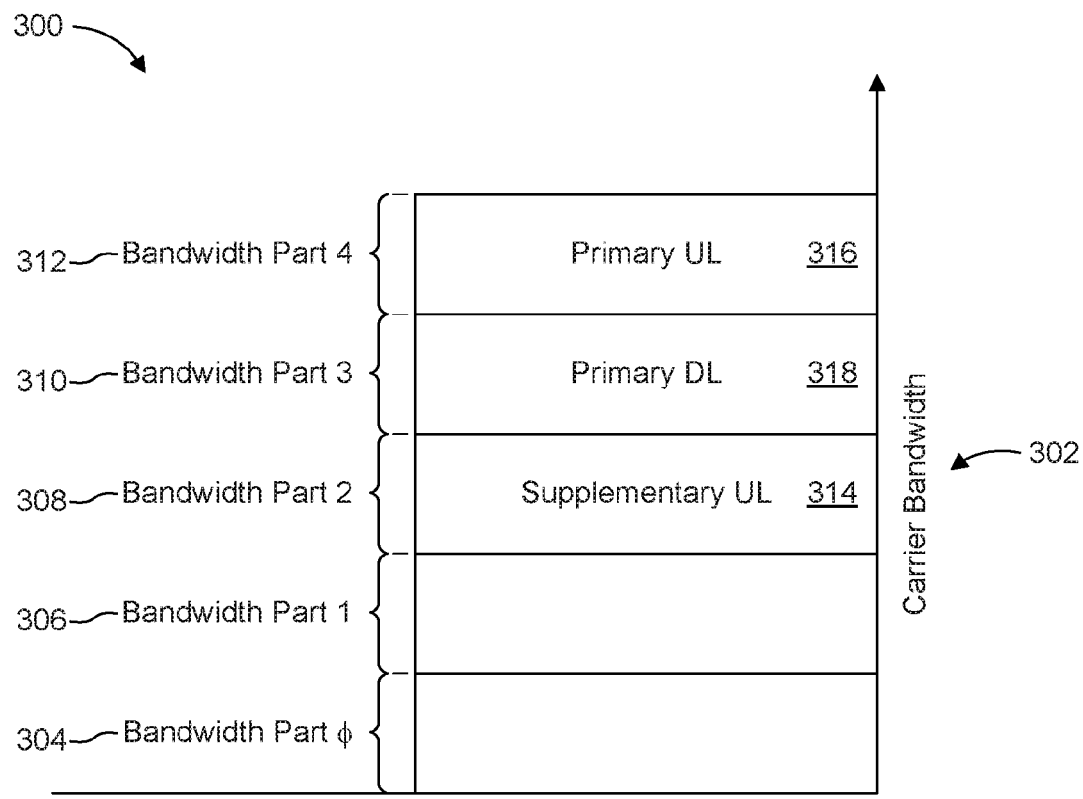
FIG. 3 is an illustration of a plurality of bandwidth parts configured over a bandwidth range.

FIG. 3 is an illustration 300 of a plurality of bandwidth parts 304-312 configured over a frequency range or bandwidth 302. Each bandwidth part 304-312 may be comprised of a subset of contiguous resource blocks (RBs) on a carrier. In one embodiment, a WTRU may be limited to four bandwidth parts simultaneously configured. In other embodiments, a WTRU may be limited to more bandwidth parts or fewer bandwidth parts. In the example shown in FIG. 3, a primary uplink carrier 316 is located at the top of the WTRU configured frequency spectrum, in bandwidth part 4 312. Primary downlink 318 is configured on bandwidth part 3 310. The lowest configured bandwidth part is bandwidth part 2 308 in which the SUL 314 is configured. Bandwidth part 0 304 and bandwidth part 1 306 have no configured uplink or downlink carrier for the WTRU.

A SUL may be configured for any type of cell including, but not limited to, a primary cell (PCell), a secondary cell (SCell) as well as a Secondary PCell (SPCell) for dual connectivity. The SUL may be configured for a standalone system or for a cell of a multi-RAT dual connectivity system.

The WTRU may perform initial access to a cell using either an RUL or an SUL carrier. A configuration for the SUL may be provided via broadcast transmission in a minimum system information (SI) transmission of a cell. For example, the WTRU may select the SUL for initial access if the DL quality of the serving cell is determined to be below a threshold. This threshold may be configured in advance or determined at some point by the WTRU. In one embodiment, a location or bandwidth may be provided via broadcast along with a subcarrier spacing and cyclic prefix. The configuration for the SUL may include a single SUL configuration or a plurality of SUL configurations for using a plurality of SUL uplink bandwidth parts. In one embodiment, a configuration of only a single RUL or only a single SUL may be broadcasted in the SI.

Different operating modes may be possible for a WTRU using an SUL in radio resource control (RRC) connected mode. In a first mode, RRC may configure the WTRU with multiple UL carriers—one of which is a RUL carrier with a typical uplink configuration for a concerned cell, and another which may minimally include a sounding reference signal (SRS) configuration, for example, the SUL carrier. In such a mode of operation, the WTRU may use the RUL carrier for all control and data transmission in the uplink. The WTRU may additionally transmit SRS using resources of the SUL carrier. The RRC reconfiguration may provide an extended, typical and/or complete uplink configuration for a different carrier to activate and/or switch the applicable active uplink carrier for the cell for some or all transmissions. In some embodiments, SUL carriers may be used for transmission of other control information.

In a second mode, RRC signaling may provide the WTRU with a configuration for multiple uplink carriers with an extended, typical and/or complete uplink configuration. In such a case, the WTRU may have a sufficient configuration to perform some or all types of uplink transmissions, for example, a physical uplink control channel (PUCCH), physical uplink shared channel (PUSCH) and/or a physical random access channel (PRACH) on resources of one or more concerned carriers. The WTRU may subsequently receive control signaling, via for example, a medium access control (MAC) control element (CE) (MAC CE) or downlink control information (DCI) signal that activates and/or initiates a switch between the UL configurations.

Figure 4:
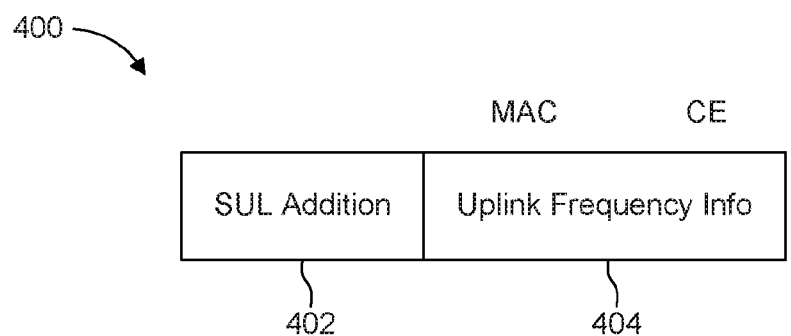
FIG. 4 is an illustration of an exemplary medium access control (MAC) control element (CE) command.

FIG. 4 illustrates an exemplary MAC CE command 400. In one embodiment, the MAC CE command 400 may comprise a header 402 which indicates SUL carrier addition. A data field 404 may follow the header 402 and indicate uplink frequency information for the added SUL carrier. This may enable the WTRU to either activate a known SUL carrier at that frequency or add an SUL carrier at the given frequency to a configuration for later activation.

In a third mode, an RRC protocol may provide a WTRU with a configuration for multiple uplinks, and two or more uplink configurations may be active either concurrently or in a time-division fashion. In one embodiment, such mode of operation includes a restriction such that the WTRU may not be required to perform some or all types of uplink transmissions simultaneously, for example, the WTRU may not be required to transmit PUSCH for the cell simultaneously on multiple uplink carriers. In an embodiment, such a restriction may be configured for the WTRU, in particular, if a capability of the WTRU indicates that such simultaneous transmission is not supported, for example, in one or more configured frequency bands. This type of WTRU may be a half-duplex WTRU operating with a single oscillator. Alternatively or in combination, WTRU may be characterized as an MTC type WTRU.

Devices which may not be capable of supporting one or more frequency bands of a wide channel bandwidth include low complexity devices, for example, Internet of Things (IOT) devices. These devices may be less complex than full feature devices and may be limited to operating in one or more narrow bands.

A WTRU may be configured with one or more bandwidth parts (BWPs) for a given cell and/or carrier. A BWP may be characterized by at least one of the following: a subcarrier spacing, a cyclic prefix or a number of contiguous physical resource blocks (PRBs). These characteristics may be configuration aspects of the WTRU and may be specified according to the capability of the WTRU. In addition, a BWP may be further characterized by a frequency location, for example, a center frequency. In an embodiment, a BWP may be characterized from another frequency location, i.e. a frequency offset.

A WTRU may be configured with an initial BWP, for example, from a reception of system information. For example, the WTRU may be configured to access the system using the initial BWP for a given cell and/or carrier. In one embodiment, such access may be an initial access, for example, when the WTRU is in IDLE mode and/or the WTRU determines that it should establish an RRC connection to the system. For example, the configuration of an initial BWP may include a configuration for random access.

A WTRU, for example, in CONNECTED mode, may be further configured with a default BWP. The default BWP may be similar to the initial BWP or it may be different. The WTRU may revert to the default BWP at the expiration of a timer, for example, after a period of scheduling inactivity. A WTRU may be configured with additional BWPs. For example, the WTRU may be configured with a BWP for a specific type of data transfers, for example, for URLLC transmissions.

Cell-based wireless systems typically operate on a downlink carrier frequency and optionally on an uplink carrier frequency for a given cell. The introduction of an SUL carrier expands the modelling of a cell of existing systems by supporting for two or more uplink carriers. For NR, the WTRU may thus be configured to operate with zero, one or two uplink carriers, for example, RUL and SUL with a single downlink carrier. Additional WTRU behavior may be useful in a wireless system that supports such additional configuration. For example, the WTRU may be configured such that the two or more uplink carriers are in different frequency bands. If this is the case, procedures which are performed traditionally based on a path loss acquisition of the paired downlink transmission in the same carrier may be affected negatively. This is because two or more uplink carriers on different frequency bands do not necessarily have mirrored channel conditions.

For example, a selection of an applicable UL carrier when performing layer-2 procedures may depend on a number of factors that may differ from previous systems. This may include conditions, criteria and triggering events to determine which of a plurality of configured uplink carriers is applicable for a particular procedure. In addition, one or more transitions in-between procedures may also be impacted, for example, transitions between any ongoing procedures.

Additional system improvements, such as for example, to perform duplication of data and/or to perform simultaneous transmission of messages using resources of two or more uplink carriers may be enabled by the support for SUL. Such improvements may be further enabled when the WTRU is configured to use the two or more available UL carriers to transmit the information to an access point, base station, gNB or other transmission reception point, for example, when the propagation conditions in one carrier deteriorates and/or when a high reliability is required.

The WTRU may be configured with one or more SUL carriers. For example, a WTRU may be configured with a plurality of SULs for a given cell. Hereafter, embodiments consider the case of a single SUL being configured by a WTRU. Methods may also be applicable for a configuration in which a WTRU is configured with a plurality of SULs. In one embodiment, SULs may be configured individually or as a combination with one another. Accordingly, embodiments may be described using the term SUL or SUL carrier. These embodiments may be applicable to a band of SULs, i.e. an SUL band or bands. As described above, some methods may be applied to one uplink carrier or to a subset of uplink carriers. For example, a WTRU first may first select a first subset of applicable uplink carriers based on downlink measurements reaching a specific threshold. Then, the WTRU may make a further determination of applicable uplink carriers, for example, based on the reception of downlink control scheduling. In one example, an uplink carrier may be represented as a configured uplink BWP. For example, some methods for the WTRU to make a determination of an applicable SUL may be based on the methods used for BWP determination and may also be made in combination with other methods. In one embodiment, the BWP determination may be a determination which concerns only uplink.

A WTRU may employ one or more different methods for RUL/SUL selection. For example, methods may be employed for using a static, semi-static, or dynamic determination of an applicable uplink carrier. Examples include the selection and/or activation of the RUL and SUL. Static methods, for example, typically by configuration or from reception of system information and/or by pre-configuration, semi-static methods, for example, typically by L3 signaling and/or RRC control or dynamic methods, for example, typically by L1/L2 signaling and/or L1/MAC control may be employed. In some examples a configuration may be pre-configured or network (NW) controlled. If NW controlled, semi-static or dynamic signaling may be used. Additionally, or in the alternative, a selection may be WTRU controlled. Using pre-configured signaling, the WTRU may be configured with both an RUL and an SUL simultaneously. In one embodiment, the SUL may be used for transmission of SRS. A threshold may also be defined or preconfigured to determine selection between one of the RUL and SUL. Network controlled signaling, a semi-static configuration or a dynamic signaling approach may be used to provide for the selection. Using a semi-static configuration, a WTRU may be configured with an RUL and only a threshold. Later, the WTRU may be configured with an SUL based on a specific event. In one embodiment, SRS may be configured on the SUL. Such a configuration may be provided by RRC, for example.

Using a dynamic signaling approach, a WTRU may receive downlink control information, for example, via a DCI indication or a MAC CE that indicates that the WTRU should use an SUL or RUL. For example, a reconfiguration of the cell with a SUL may be conveyed via a DCI, for example, for cross-carrier scheduling using a carrier ID for the SUL carrier or for example, for BWP control of the associated SUL.

A combination of semi-static signaling and dynamic configuration/signaling may also be used. For example, a DCI with a specific HARQ process ID may be used to convey information for the WTRU using one or both of the SUL or the RUL. In such an example, the WTRU being first configured with different sets of HARQ processes for the RUL and for the SUL, then the WTRU making a determination of what UL to use based on a process ID indicated by or included in the DCI which may be configured or dynamically allocated.

In a WTRU-initiated approach, the WTRU may determine that a threshold is reached and may initiate a procedure to perform a switch or selection between the SUL and RUL or perform a switch involving both. Such a procedure may include a method for the network to determine that a change of applicable uplink carrier may have occurred, for example, by the WTRU initiating transmission of a SRS on the applicable carrier and/or from a random access procedure and/or from the transmission of uplink control information. The network may then take action to instruct the switch, via for example, MAC CE, DCI, RRC or the like. In one embodiment, the network may provide an UL-SCH resource on the SUL.

Some embodiments involve combinations of the above. There may also be more dynamic causes for switching or for UL carrier selection that may be determined based on at least one of the following criteria: system related timing, type of transmission, SCS applicable for a transmission, logical channel (LCH) configuration, service, payload including an amount of data available for transmission and/or data size, indication of an UL grant or DL assignment, RV of a transmission, WTRU speed and QOS.

System-related timing may include, for example, some symbols, mini-slots, slots, a subframe and/or a plurality of subframes which may be associated with a specific UL carrier. A type of transmission, for example, may be or may include uplink control information, RRC, data, signal and/or uplink channel, for example, a PUCCH, PUSCH, SRS or other uplink channel transmission. The WTRU may perform a transmission of uplink control information, for example, HARQ feedback, channel quality indication, or the like using a first carrier such as the RUL carrier while it may perform transmission of data on the resources of a second carrier such as the SUL. This segregation of control information and data transmission may occur when the WTRU determines that a certain threshold is met. The threshold may involve considerations of subcarrier spacing (SCS) or LCH configuration.

A WTRU may consider an SCS which is applicable for a given transmission. For example, the WTRU may perform a first transmission using the resources of a first uplink carrier configured with a first SCS, and it may perform a second transmission using the resources of a second uplink carrier configured with a second SCS as a function of a configuration aspect, for example, an association between a type of bearer, for example a signaling radio bearer (SRB) or data radio bearer (DRB) and an applicable SCS.

A WTRU may consider an LCH configuration for a given transmission. For example, the WTRU may be configured with an association between one or more applicable uplink carrier(s) and an LCH or a group thereof, for example, an LCG for the transmission of data from the concerned LCH(s). The WTRU may determine the applicable uplink carrier when the WTRU determines that it has new data available for transmission as a function of the LCH associated with the data.

A service type, for example, URLLC, eMBB, mMTC may be considered in determining whether a transmission occurs over an RUL or an SUL. In addition, a payload including an amount of data available for transmission and/or data size may be considered for the determination. For example, the WTRU may be configured to determine an applicable uplink carrier as a function of the size of the data to be transmitted. Such size may correspond to a transport block, a MAC PDU, a RLC PDU or a PDCP PDU for a given transmission. Such size may correspond to a total amount of data available for transmissions, for one or for a subset or for all the LCH(s). For example, the WTRU may determine that it should use resources of a first uplink carrier, for example, an SUL, if it determines that the amount of data is less than a threshold value. Otherwise, the WTRU may use those resources of a second uplink carrier. In one embodiment, this may be in combination with other criteria or criterion. If the WTRU is configured with an SUL, the WTRU may determine that it should use resources of a first uplink carrier, for example, the RUL, if it determines that the amount of data is more than a threshold value and if the estimated pathloss is less than a threshold and/or less than a total available power less a value associated with the concerned data size. Otherwise, the WTRU may use resources of a second uplink carrier, for example, the SUL.

A WTRU may consider an indication received in an UL grant or DL assignment. For example, the WTRU may receive downlink control signaling that indicates an applicable uplink carrier for the transmission of HARQ feedback for a downlink transmission. For example, the WTRU may receive downlink control signaling that indicates the applicable uplink carrier for the transmission of a transport block in an uplink transmission. In one embodiment, the indication may be a configuration aspect, for example, for a configured grant and/or for semi-persistent scheduling.

A WTRU may consider an RV of a transmission in determining an applicable UL carrier. For example, the WTRU may determine the applicable UL carrier from a sequence of the (re)transmissions for a HARQ process. For example, a HARQ retransmission may use a different UL carrier than a previous (re)transmission as a function of the applicable redundancy version. WTRU speed and QoS, for example, latency requirements of data to be transmitted are additional criteria.

Figure 5A:
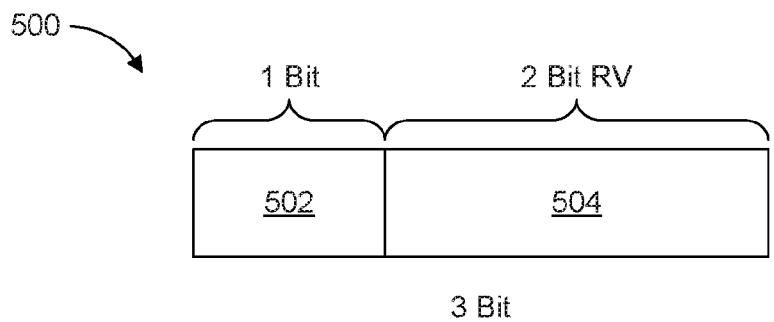
FIG. 5A is a logical representation of a three bit redundancy version (RV) counter.

FIG. 5A represents a three bit RV counter 500. In FIG. 5A, least significant bits 504 are configured to count from decimal 0 to 3, i.e. binary 00 to 11. In one embodiment, a WTRU may begin with a redundancy version of 0. Each time a transmission is in error, the WTRU may increment the RV by 1. Once a rollover occurs, the left most bit 502 will change from a 0 to a 1. This may indicate a switchpoint for use of the SUL.

Figure 5B:
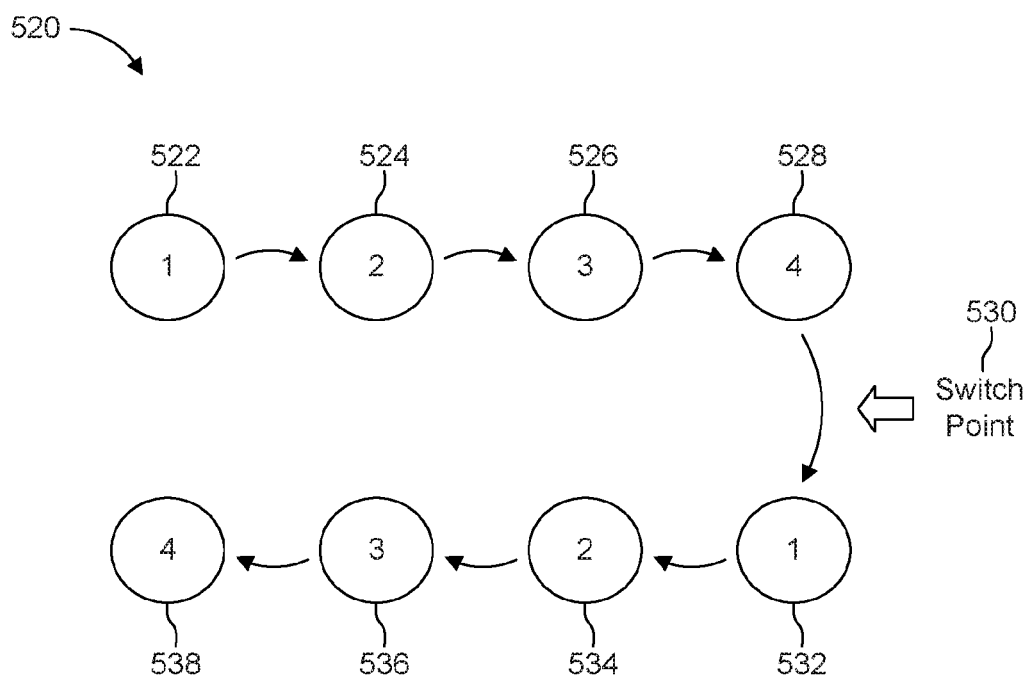
FIG. 5B is a state diagram which illustrates the three bit RV counter of FIG. 5A.

FIG. 5B is a state diagram 520 which illustrates the three bit RV counter of FIG. 5A. In one embodiment, a WTRU may change state once a random access or other transmission fails. In each state, a redundancy version may be different than a previous state. For example, a first state 522 represents the 2 bit RV 504 in a 0 state. Upon a failed transmission, an RV is incremented as the WTRU enters second state 524. Then WTRU may then enter a third state 526 followed by a fourth state 528 if necessary. Once in the fourth state 528, the WTRU increments the RV and this increment may toggle a switchpoint of the SUL 530. Once this switchpoint occurs, the WTRU may enter a first state 532 corresponding to the SUL and continue incrementing an RV as necessary. The WTRU may enter a second state 534, third state 536 and fourth state 538. Each of these states represents a different RV for which the WTRU may make an alternative or redundant transmission as compared to a previous transmission in a previous state. The WTRU may cycle back to the RUL after expiration of a timer or another event occurs or transpires.

A WTRU may perform one or more random access procedures with an SUL. The WTRU may initiate an RA procedure using resources associated with an uplink carrier configured as a default uplink carrier, for example, for an initial access or at handover. If the WTRU has received an indication to switch to the SUL, or if a condition to switch to the SUL has been triggered, the WTRU may perform an RA procedure on an uplink carrier other than the default carrier, for example, on the SUL.

In one embodiment, for initial access, moving from RRC_IDLE to RRC_CONNECTED, in addition to the switching methods above, the following events may further be taken into account. The WTRU may receive the configuration of the SUL in a remaining minimum system information (RMSI) delivery. If the received RSRP is below a threshold the WTRU may use SUL for RACH. Otherwise, the WTRU may perform the RACH procedure on the regular uplink. In addition to this switching method, the following trigger conditions to generate a RA procedure on SUL are listed below.

The WTRU may have a maximum number of retransmissions preambleTransMax_RUL for RUL, when this value is reached, the WTRU may switch to SUL. Another value of premableTransMax_SUL for the SUL is set, and the WTRU may attempt its RACH according to the same rules.

The WTRU may be configured with a single number of retransmissions (preambleTransMax) applicable to one or both of an RUL and an SUL. The WTRU may alternate between RACH attempts on RUL and SUL at each power ramping step. Alternatively, a WTRU may increment power each time on a single RUL or SUL before switching. The WTRU may increment the preamble transmission counter once for an attempt on both RUL and SUL or based on individual attempts independently of the applicable uplink carrier. The WTRU may be configured with separate parameters for each uplink carrier.

When the WTRU performs an RA on the RUL, the WTRU may increase its transmission power at each attempt. The WTRU may perform beam selection for each attempt, for example, the WTRU may try a different beam until the WTRU determines that the transmission is successful. In one embodiment, if $P_{c\_max}$ is reached on one or more attempts using the RUL, the WTRU may switch to the SUL. The WTRU may reinitialize the power of transmission after a change of uplink carrier, for example, the SUL. The WTRU follows the same rule and ramps up the power with the same or a different pc_max configured value associated to the SUL.

Figure 6:
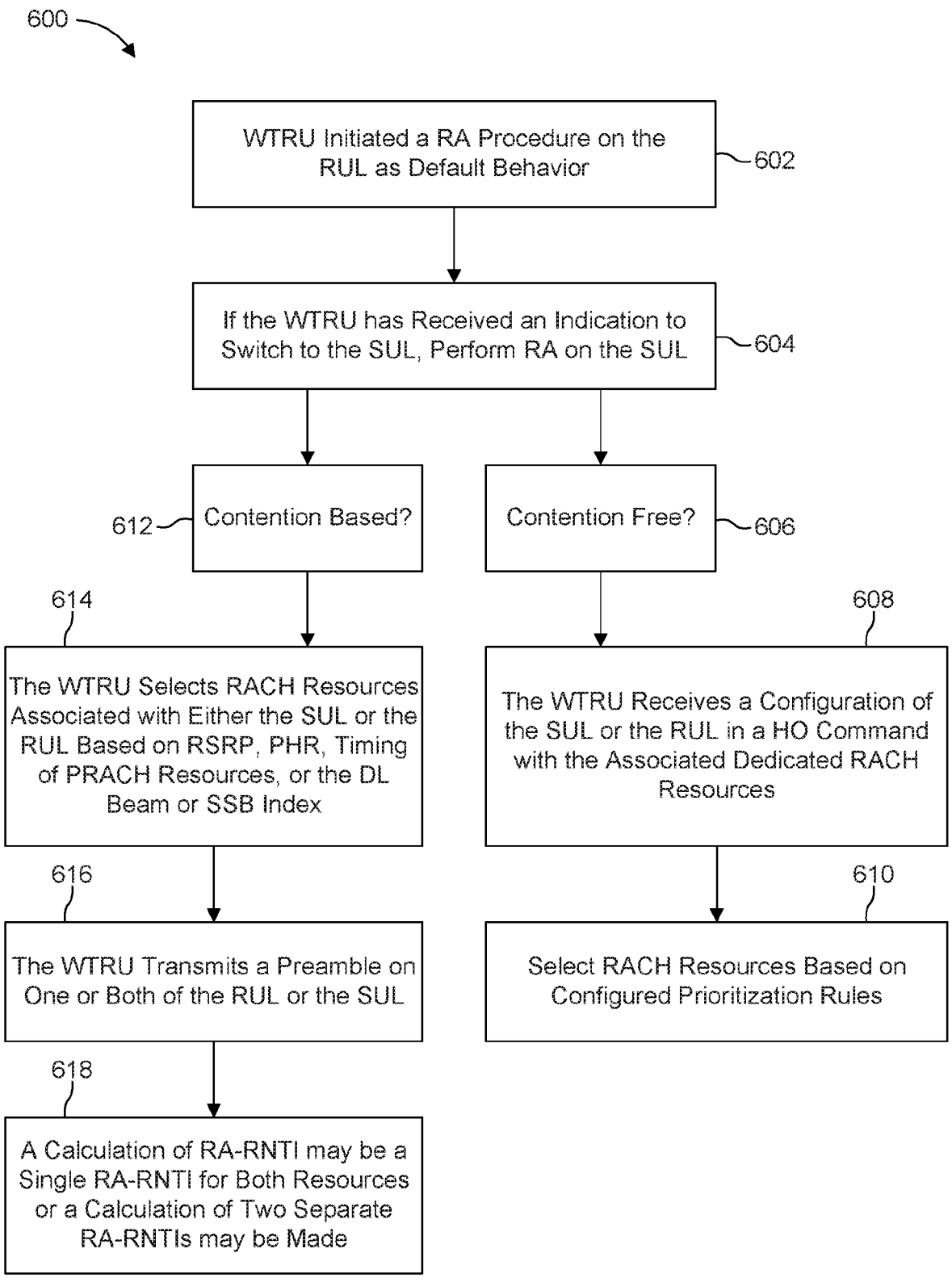
FIG. 6 is a flowchart of a random access (RA) procedure initiated by a WTRU.

FIG. 6 is a flowchart 600 of a WTRU initiated RA procedure. If the WTRU initiates a RACH procedure 602 on the RUL, the WTRU may receive 604 an indication in msg2 to switch to another uplink carrier, for example, the SUL, and the UL grant for msg3 may be applicable for the resources associated with the other uplink carrier, for example, in the associated SUL band. In one example, a WTRU may use the SUL for a handover when the device is in an RRC_CONNECTED mode. The WTRU may determine whether or not RA shall be performed as a contention based procedure or as a contention free procedure 606.

During contention-free random access 606, the WTRU may receive 608 a configuration of an SUL or an RUL in a HO command with associated dedicated or common RACH resources. If the WTRU is configured with dedicated RACH resources in both SUL and RUL, the selection of a PRACH resource may depend on at least one of: the received RSRP of the DL beams paired to the RUL such that if the RSRP is below a configured threshold, the WTRU transmits on the PRACH associated to the SUL; the timing of the PRACH resource; or the need for beam sweeping the RACH transmission. Depending on whether a WTRU needs to beam sweep a PRACH transmission on the RUL or the SUL, the WTRU may select 610 an appropriate carrier. For example, if the UL transmit beam may not be determined from the DL receive beam, a WTRU may be required to beam sweep a PRACH transmission. In another example, an UL beam pair link (BPL) may have an expiry timer and if the UL BPL is still valid, the WTRU may not need to beam sweep a PRACH transmission.

If the WTRU is configured with dedicated RACH resources on an SUL and common RACH resources on an RUL, the WTRU may prioritize the dedicated RACH resources on the SUL and may fall back to the RUL only if the random access on the SUL has failed. Alternatively, if the WTRU is configured with dedicated RACH resources on an RUL and common RACH resources on an SUL, the WTRU may prioritize the dedicated RACH resources in the RUL and may fall back to the SUL only if the random access on the RUL has failed.

For a contention based random access 612, the WTRU may select 614 common RACH resources either associated to the RUL or the SUL based on at least one of: the RSRP of the target cell; the PHR for each UL carrier; the timing of the PRACH resources; and/or the DL beam or a synchronization signal block (SSB) index used by the WTRU. The WTRU may transmit 616 a preamble on resources of both the RUL and the SUL. The WTRU may use 618 a single RA-RNTI for both resources or calculate two separate RA-RNTIs for the RUL and SUL. For example, a WTRU may transmit preambles on both RUL and SUL in a manner that enables the network to know that the two preambles originate from the same WTRU. For example, the WTRU may append a short signature sequence to each preamble transmission. This may enable the WTRU to determine the appropriate UL carrier to continue with for the RA procedure. The WTRU may monitor for RAR with two different RA-RNTIs corresponding to both the transmission on the uplink.

In another method, upon transmitting preambles on both the RUL and the SUL, the WTRU may expect, monitor for and receive an RAR corresponding to each preamble transmission. The RAR may provide information to the WTRU to enable the WTRU to select an appropriate grant, for example, an UL carrier to use for a msg3 transmission. In an example, each RAR may include quality criterion that may indicate to the WTRU whether it may continue RA on RUL or may use SUL. The WTRU may transmit a msg3 on the UL resources indicated in the RAR. The WTRU may transmit a msg3 on the UL associated with the first RAR received. For RA in connected mode triggered by an SR procedure or due to a timing misalignment on the either UL, the conditions to generate an RA procedure on an SUL may include the following. The WTRU may determine if the QoS or priority of the LCH that triggered the SR in connected mode is within a configured set. Such may be conditioned on the coverage of the UL and the periodicities of PRACH resources on the UL and SUL in the time domain. The WTRU may determine if the SR configuration on which the RA was triggered is used to distinguish the need for a resource on the SUL. This determination may be used in conjunction with WTRU autonomous switching between RUL and SUL for PUSCH transmissions. If the SR configuration on which RA was triggered contains PUCCH resources on the SUL, the WTRU may switch to the SUL for the msg3 transmission. The WTRU may consider other conditions such as a buffer status or power headroom (PHR) for each UL carrier or a timing of the SR resource in determining whether to switch to the UL carrier.

In general, if an event to generate RA on the SUL is triggered and the WTRU has already started an RA procedure on the RUL, the WTRU may terminate the RUL RA procedure even if it has not reached preambleTransMax, the WTRU may wait for the RUL RA procedure to complete and the WTRU may start a parallel RA procedure on the SUL if the WTRU is capable or continue the procedure with the SUL if the WTRU is capable.

A WTRU may calculate an RA-RNTI when transmitting two separate preambles. In one embodiment, the WTRU may calculate a single RA-RNTI based on a resource selection for the preamble on one of the carriers, for example, one of the SUL or the RUL. In one embodiment, this selection is configurable. This method may be applicable when the PRACH resource selection for RUL and SUL are identical, or have some relation which may be detectable by a base station or network. In another embodiment, the WTRU may compute two independent RA-RNTIs based on the PRACH resources selected by the WTRU, assuming the resources are selected independently on each carrier. In another embodiment, applicable for the selection of the same preamble resources in both carriers, the WTRU may compute two RA-RNTIs, for example, by applying a carrier offset to the calculation. The WTRU may determine the UL to transmit on based on the RA-RNTI in which it used to decode msg2.

For a random access resource selection of a WTRU configured with an SUL, resources may be partitioned into two groups: group A and group B, such as in LTE for the case of an SpCell. Alternatively or in combination, this grouping may be kept only for the RUL. If such a grouping exists, the MAC entity may randomly select one of the PRACH resources within group B if the potential message size, for example, UL data available for transmission plus a MAC header and and MAC control elements when required, is greater than messageSizeGroupA and the pathloss is less than $P_{CMAX,c}$ (of the serving cell performing the RA procedure)—preambleInitialReceivedTargetPower—deltaPreambleMsg3—messagePowerOffsetGroupB.

The path loss estimate may be obtained based on the path loss estimated on the DL carrier where the WTRU receives the RMSI. Otherwise, the MAC entity may select the select a preamble from the RA preambles of group A.

If the WTRU is not capable of estimating the path loss based on the DL carrier or the network explicitly indicates to the WTRU to not consider the path loss in the group selection, the MAC entity randomly selects one of the PRACH resources based on the msg3 size only.

Figure 7:
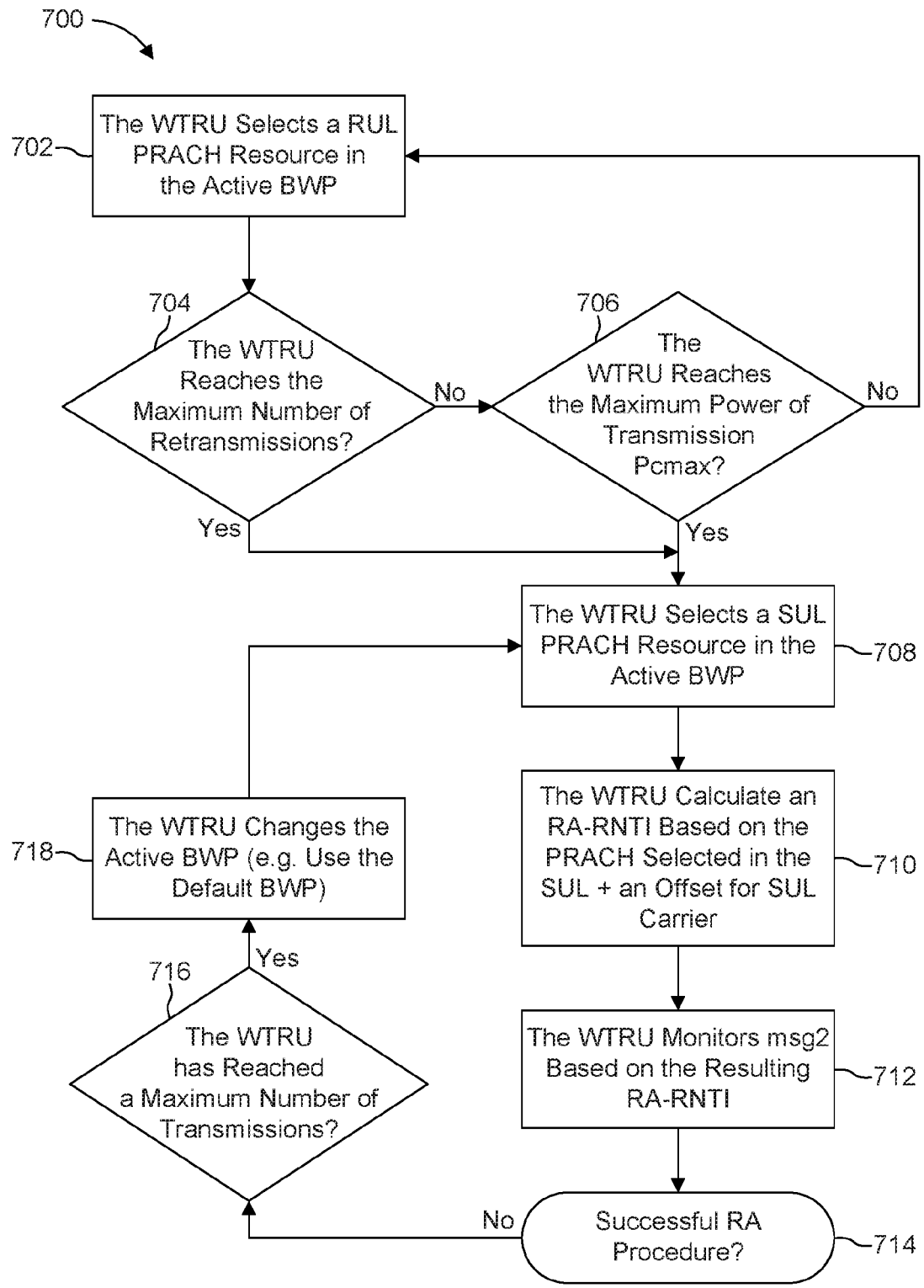
FIG. 7 is a flowchart which illustrates an exemplary method for determining whether to switch to a supplementary uplink (SUL) carrier for RA.

FIG. 7 is a flowchart 700 which illustrates an exemplary method for determining whether to switch to an SUL for RA. Initially, a WTRU may select 702 a RUL PRACH resource in the active BWP of the RUL carrier. The WTRU may transmit on the PRACH resource and determine whether the transmission was successful. If not, the WTRU may check a running counter of a number of retries. If the counter is less than a maximum number of retransmissions 704 and the maximum transmission power Pcmax has not been reached 706, then the WTRU may select 702 another RUL PRACH resource in the active BWP. Otherwise, once Pcmax is met, the WTRU may select 708 a SUL PRACH resource in an active BWP. The WTRU may calculate 710 an RA-RNTI based on the PRACH resource selected in the RUL selection 702 and apply an offset for the SUL carrier to it. The UE may transmit PRACH on the SUL and monitor 712 msg2 based on the resulting RA-RNTI. If the RA procedure is successful 714 on the SUL, the procedure may end and the WTRU may use the SUL accordingly. If the procedure is unsuccessful, the WTRU may determine whether 716 a maximum number of retransmissions is reached. If the maximum number of transmission has not been met, the WTRU may retransmit on the SUL. If the maximum number of transmissions has been met, the UE may change 718 the active BWP and revert to a default BWP. The WTRU may then again select 718 a SUL PRACH resource in the new active BWP.

A random access procedure on an SUL carrier may be performed in a beamformed system. This WTRU may be configured with an SUL on lower NR bands, for example, centimeter wave (cmWave), which may have better propagation characteristics than the higher regular bands where the WTRU is configured to perform its UL transmission. The same trigger conditions as for the SUL in sub-6 GHz bands (e.g. LTE bands) may apply. However, the random access procedure in the case of connected mode WTRUs is impacted in this scenario.

The WTRU may be configured with RACH resources associated with CSI-RS and NR-SS respectively. The WTRU may measure the beams associated with these reference signals. If the measured quality is above a certain threshold, the WTRU may make an attempt on the dedicated RACH resources first, either associated to SSB or CSI-RS resources, then fall back to the common RACH resources associated with SSBs if necessary.

Being able to measure the DL reference signals associated with each one of the beams may permit the WTRU to determine the suitability of the beams before performing an RA procedure on these beams. However, in the case of SUL in a beamformed system, the WTRU cannot determine the suitability of the beams associated to the SUL.

In one or more embodiments, a beamformed SUL RACH procedure without DL or UL channel information may be performed. If it is assumed that a co-location or partial beam correspondence exists, a cmW RACH procedure using a wider beam could be based on a mmW DL SSB reference. The reference may factor in path loss compensation between cmW and mmW. In one embodiment, beam sweeping may employed. By sweeping beams, multiple msg1 transmissions may be made on beams of the SUL. In one embodiment, SRS transmissions may be beamformed. In one embodiment, the WTRU may always use an SSB when the WTRU performs RACH procedure on the SSB.

An SR configuration may be modeled in the context of SUL or UL. The WTRU may use one or more SR configurations to indicate a type of UL transmission resource. The UL resource may be distinguished by whether the UL-SCH resource is on the RUL or the USL. The WTRU may use SR configurations in conjunction with WTRU autonomous switching between RUL and SUL for PUSCH transmissions. Such indication may be explicitly made by selecting an SR configuration made available by the gNB to indicate the need for an UL-SCH resource on the SUL as compared to the RUL. In such modelling, the SR configurations of the RUL and SUL are invoked as separate SR procedures where each SR configuration may have an SR counter, max number of SR attempts and SR prohibit timer.

In alternative modelling, a single SR configuration may contain PUCCH resources on both the RUL and SUL. In such case, the SR configuration may not be used explicitly to distinguish the UL on which the UL-SCH resource is needed. Instead, the selected PUCCH resource within the configuration is used an implicit indication of which UL is desired. A WTRU may transmit SR on both RUL and SUL, in one embodiment, simultaneously. This may enable higher reliability and may also enable the network to load balance between the RUL and SUL.

RRC may further configure each logical channel with an appropriate SR configuration and corresponding PUCCH resources, depending on whether the LCH is allowed to transmit an SR on the RUL, SUL or both.

Some criteria may further be used to determine which SR configuration or which PUCCH resource within an SR configuration should be used for a given LCH. For example, such criteria may depend on UL and/or DL coverage levels. In one example, a reference signal received power (RSRP) measurement combined with a configured or predefined threshold may be used to further determine which SR configuration and/or PUCCH resource to use. In another example, the HARQ operating point of the WTRU may be used to further determine which SR configuration and/or PUCCH resource to use. For instance, reaching a certain number of HARQ retransmissions on the RUL may result in having the MAC entity trigger an SR on a given SR configuration or a certain PUCCH resource. Similarly, a drop in the pathloss estimate or the RSRP may result in having the MAC entity trigger an SR on a given SR configuration or a certain PUCCH resource.

In case a gNB configures separate SR configurations to distinguish whether an uplink shared channel (UL-SCH) resource is on the SUL or the RUL, a LCH may be mapped to both configurations. If the SR counter of either configuration reaches its SR-transMax, the MAC entity may notify RRC to release PUCCH resource, and may initiate random access immediately. Alternatively, the MAC entity may move to the SR configuration of the other uplink. Once the SR-transMax is reached for both SR configurations, the WTRU may notify RRC to release associated PUCCH resources and initiate random access.

In case the gNB configures a single SR configuration with PUCCH resources on both the SUL and RUL, the MAC entity may maintain a single SR counter and may invoke a single SR procedure for such configuration. When the counter reaches Sr-transMax, the WTRU notifies RRC to release any associated PUCCH resources and initiates random access. When random access is initiated as part of the SR procedure, selection between an SUL and an RUL for RA may be prioritized.

Scheduling request (SR) failures may occur and may be handled appropriately by the WTRU. In one embodiment, a WTRU may be configured with one or more dedicated resource(s) for an SR. For example, such resource(s) may be for the transmission of a SR on PUCCH. For example, the WTRU may be configured with one or more dedicated resources for SR (D-SR) for an uplink carrier. The WTRU may initiate the SR procedure using the one or more D-SRs on the uplink carrier. The WTRU may determine that it has reached the maximum number of D-SR transmissions for the uplink carrier. The WTRU may be configured with D-SR for the RUL and/or for the SUL.

In the event of a D-SR failure on the RUL occurs, an SR may be triggered on SUL or SUL activation. In one method, the WTRU may activate the SUL and/or initiate a SR of the resources of the SUL when the WTRU determines that it has reached the maximum number of D-SR transmissions for the RUL. The WTRU may perform the SR using the D-SR of the SUL, if configured, or using a random access procedure otherwise.

A D-SR failure on an UL carrier may trigger a reconfiguration of the WTRU to an initial BWP for the cell. The may be true for any cell, with or without an SUL. In one method, the WTRU may determine that a D-SR on the uplink carrier has failed when the WTRU determines that it has reached the maximum number of D-SR transmission for the uplink carrier. The WTRU may then revert to the initial BWP for the first cell. The first cell may be the cell associated with the D-SR resources. Alternatively, the first cell may be the primary cell of the WTRU, for example, the WTRU may be configured with a PCell. Alternatively, the first cell may be the primary cell of the WTRU as it applies to a group of cells associated with the D-SR resources. In one embodiment, the WTRU may reconfigure the DL BWP to the initial BWP of the first cell. In one embodiment, the WTRU may reconfigure the UL BWP to the initial BWP for the first cell. The WTRU may then initiate an RA procedure using the RA resources applicable to the initial BWP for the first cell.

A D-SR failure on the RUL may trigger reconfiguration to an initial BWP for the cell and RACH on RUL. In one example, where the WTRU is configured to perform RA using the initial BWP of the cell when it determines that D-SR failure has occurred for the RUL, such uplink carrier for the first cell may be the RUL.

A D-SR failure on the SUL may trigger reconfiguration to an initial BWP for the cell and RACH on the SUL. In one example, the WTRU is configured to perform random access using the initial BWP of the cell when it determines that D-SR failure has occurred for the SUL, such uplink carrier for the first cell may be the SUL.

A contention-based random access procedure (CBRA) performed on an initial BWP may follow an SR failure. In one example, the WTRU may initiate CBRA when it initiates an RA procedure using the initial BWP, for example, as determined according to any of the above events. In one embodiment, this may only be initiated when the WTRU determines that D-SR has been unsuccessful.

A RACH using PRACH resources associated with a specific type of synchronization signal (SS) may follow an SR failure. In one example, the WTRU may initiate the random access procedure, for example, a CBRA, using PRACH resources and/or a configuration associated with a specific reference signal. Such reference signal may be a cell common reference signal, for example, the NR-SS. Such reference signal may be a dedicated reference signal, for example, a CSI-RS or a NR-SS. The WTRU may select such resources based on the reference signal and/or a type thereof when it initiates the random access procedure using the initial BWP, for example, as determined according to any of the above events. In one embodiment, only initiated when the WTRU determines that a D-SR procedure has been unsuccessful.

A RACH procedure on an initial BWP of a PCell may follow an SR failure. In one example, the WTRU may initiate the random access procedure on a WTRU configured PCell when the WTRU initiates a random access procedure using an initial BWP, for example, as determined according to any of the above events. In one embodiment, only initiated when the WTRU determines that a D-SR procedure has been unsuccessful.

For any of the above scenarios, using the default BWP may be used, if configured. In one example, the WTRU may initiate a random access procedure on a default BWP if configured by the WTRU for the concerned cell. This initiation may occur when the WTRU initiates the RA procedure using the initial BWP, for example, as determined according to any of the above events. In one embodiment, it is only initiated when the WTRU determines that a D-SR procedure has been unsuccessful.

Any of the above scenarios may apply for the general case of SR using either the RACH, D-SR or a maximum number of HARQ transmissions on a grantless resource. In one example, the WTRU may perform any of the above procedures when a determination that an attempt to acquire and/or use the resources of a given cell and/or carrier has been unsuccessful. In one embodiment, the determination may be made following a maximum number of transmissions and/or after a certain amount of time has elapsed since the start of a procedure, for example, an SR procedure, a HARQ process or a RACH procedure. The amount of time which has elapsed may be timed using a timer. When the timer has expired, the WTRU be configured to act accordingly.

In one example, the WTRU may perform any of the above procedures based on a determination that a maximum number of HARQ transmissions for a transport block using a configured uplink resource has been reached. For example, a configured uplink resource may be a semi-persistent uplink grant, for example, a semi-persistent scheduling (SPS) grant. For example, such configured uplink resource may be for a grantless transmission. For example, such configured uplink resource may be for a transmission with the reception of dynamic control information for a specific type of grant and/or resource.

In an embodiment, the WTRU may determine that it is experiencing radio link failure following any of the above realization and/or combinations, when it determines that the RA procedure has been unsuccessful, for example, using resources of the concerned cell for the initial BWP. Any of the above methods may be used alone or in combination.

In one scenario, a D-SR failure on an RUL may occur first, then a D-SR failure may occur on the SUL. In response, the WTRU may perform a RACH procedure on an initial BWP on the RUL. For example, the WTRU may be configured to perform SR on the SUL when the WTRU determines that the D-SR on the RUL has been unsuccessful. The WTRU may be configured to revert to the default BWP of the RUL when the WTRU determines that the SR has been unsuccessful on the SUL. The WTRU may then initiate the random access procedure on the RUL for the cell.

Figure 8:
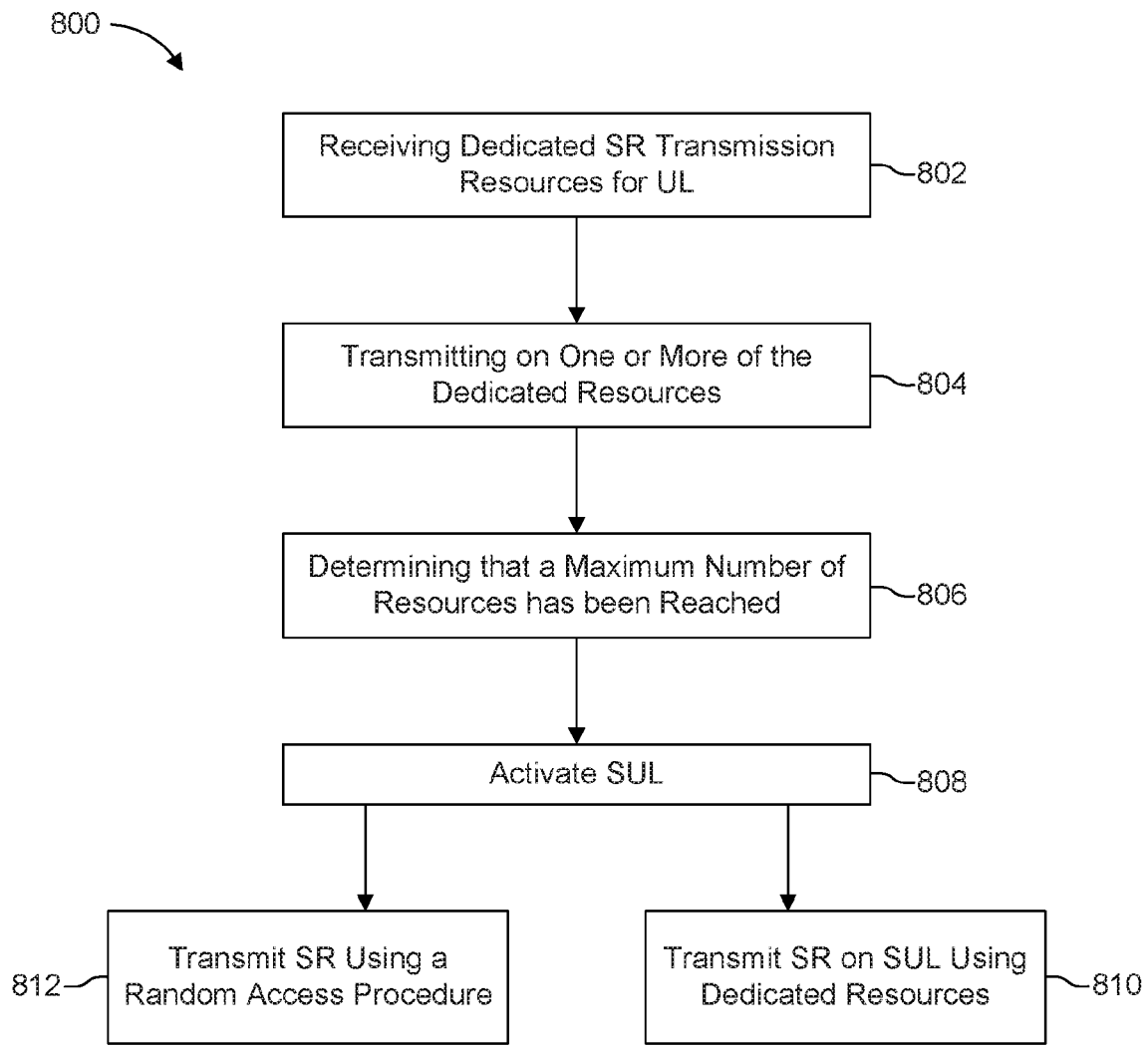
FIG. 8 is a flowchart of an exemplary procedure for transmitting a scheduling request (SR)

FIG. 8 is a flowchart 800 of an exemplary procedure for transmitting an SR by a WTRU. As shown in FIG. 8, the WTRU may be configured with 802 a dedicated resource for SR (D-SR) on the RUL or on the SUL. In one embodiment, the resource may be pre-configured or alternatively the resource may be received for the network. The WTRU may transmit 804 on the one or more dedicated resources and if the transmission is unsuccessful, the WTRU may increment a count corresponding to a maximum number of transmission resources. If the maximum number of resources is reached 806, the WTRU may active 808 an SUL. The WTRU may then determine to transmit SR using a random access procedure or transmit the SR on dedicated resources of the SUL.

The WTRU may be configured to perform RA using the resources of the RUL and the initial BWP for the cell when the WTRU determines that D-SR has been unsuccessful. A D-SR failure on either RUL or SUL may lead to CBRA on an initial BWP of RUL.

Figure 9:
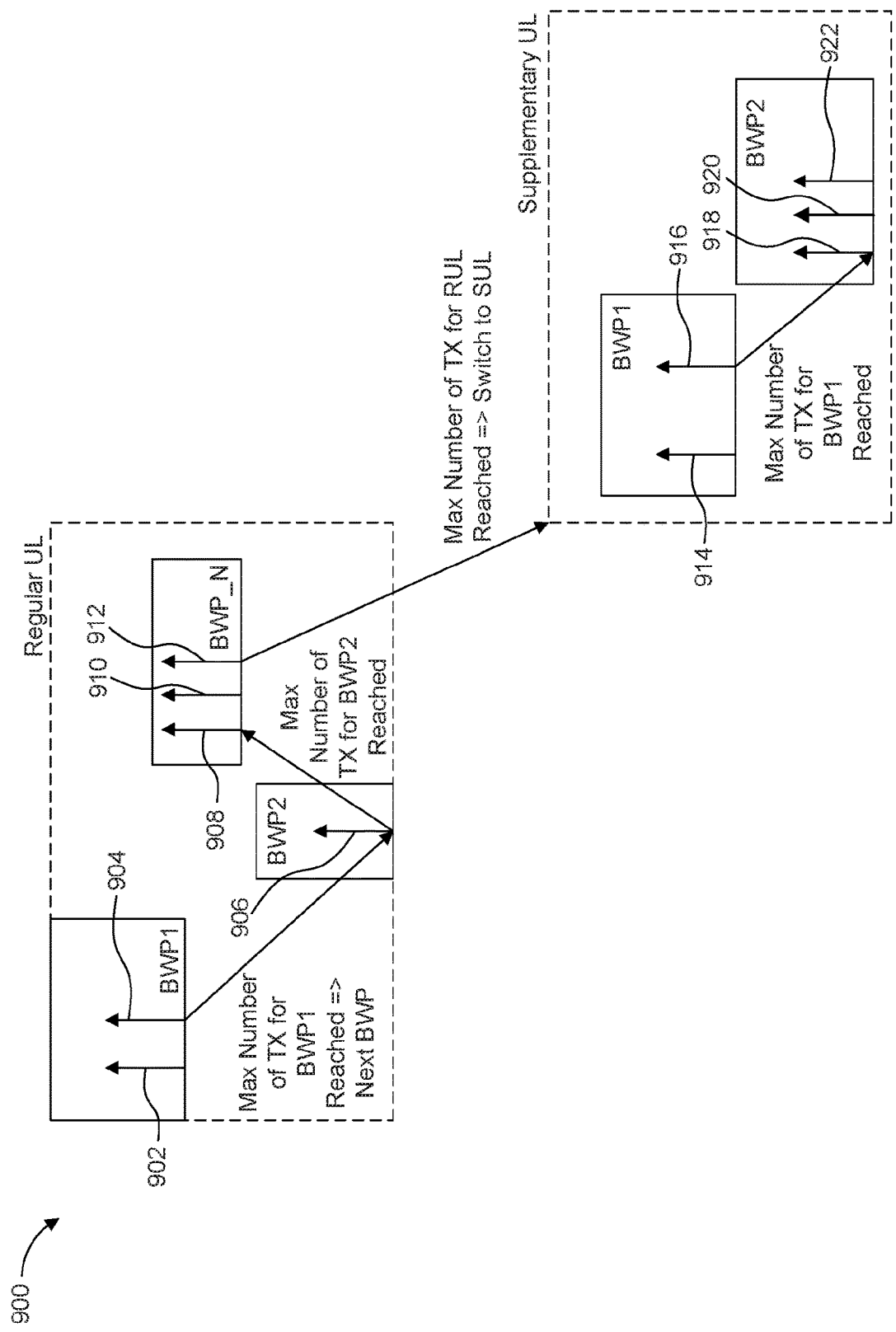
FIG. 9 is a timing diagram which illustrates bandwidth part RA transmissions on an RUL carrier followed by bandwidth part RA transmissions on an SUL carrier.

FIG. 9 is a timing diagram 900 which illustrates bandwidth part RA transmissions on an RUL carrier followed by bandwidth part RA transmissions on an SUL carrier. A WTRU may make a first RA transmission 902 on a first bandwidth part (BWP1) followed by a second RA transmission 904 on BWP1. The WTRU may determine that a maximum number of transmissions has been reached on BWP1 and then may switch to bandwidth part 2 (BWP2). For example, on BWP2 there may be only a single transmission 906 before a switch is made to another bandwidth part (BWP_N). On BWP_N, the WTRU may make a first RA transmission 908, followed by a second RA transmission 910 and a third RA transmission 912 before determining that a maximum number of transmissions has been met on the BWP_N. Once all BWPs on the RUL carrier are made, the WTRU may switch to a SUL carrier. On the SUL carrier, the WTRU may transmit 914 on a first bandwidth part (BWP1) of the SUL and then transmit 916 again. If a maximum number of transmissions are met on BWP1 for the SUL, the WTRU may transmit a first RA transmission 918 on a second bandwidth part (BWP_2) followed by a second transmission 920 and a third transmission 922.

RA may always be performed using the RA resources of the initial BWP upon determination of an impairment on other RA resources, on another BWP or the like. The WTRU may reconfigure to and/or set as the active BWP the initial BWP when it determines an impairment condition. For example, a determination of such impairment may include a determination that D-SR has been unsuccessful, a determination that a random access procedure has been unsuccessful, a determination of radio link problems, a determination of radio link failure, a determination that a maximum number of HARQ transmissions has been reached for a given HARQ process and/or a determination that a measurement is below a threshold. In one embodiment the measurement may indicate that radio link quality is insufficient. The WTRU may further initiate the random access procedure using resources associated to the initial BWP.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising a processor and memory, the processor and memory configured to:
   attempt to acquire a channel on a first bandwidth part (BWP);
   determine that the attempt to acquire the channel on the first BWP was unsuccessful based on a maximum number of unsuccessful access attempts being reached for the first BWP;
   switch, based on at least the maximum number of unsuccessful access attempts being reached for the first BWP, from the first BWP associated with the uplink carrier to a second BWP associated with the same uplink carrier, the first BWP being a different BWP than the second BWP for the same uplink carrier;
   transmit a random access (RA) preamble via the second BWP associated with the same uplink carrier after the maximum number of unsuccessful access attempts is reached for the first BWP; and
   receive a random access response (RAR) in response to the RA preamble transmitted via the second BWP.

2. The WTRU of claim 1, wherein the channel is associated with a primary cell.

3. The WTRU of claim 1, wherein a RAR is received.

4. The WTRU of claim 1, wherein the channel is a channel of an unlicensed spectrum.

5. The WTRU of claim 1, wherein the unsuccessful access attempts comprise an unsuccessful attempt of a random access transmission.

6. A method performed by a wireless transmit/receive unit (WTRU), the method comprising:
   attempting to acquire a channel on a first bandwidth part (BWP);
   determining that the attempt to acquire the channel on the first BWP was unsuccessful based on a maximum number of unsuccessful access attempts being reached for the first BWP;
   switching, based on at least the maximum number of unsuccessful access attempts being reached for the first BWP, from the first BWP associated with the uplink carrier to a second BWP associated with the same uplink carrier, the first BWP being a different BWP than the second BWP for the same uplink carrier;
   transmitting a random access (RA) preamble via the second BWP associated with the same uplink carrier after the maximum number of unsuccessful access attempts is reached for the first BWP; and
   receiving a random access response (RAR) in response to the RA preamble transmitted via the second BWP.

7. The method of claim 6, wherein the channel is associated with a primary cell.

8. The method of claim 6, wherein the channel is a channel of an unlicensed spectrum.

9. The method of claim 6, wherein the unsuccessful access attempts comprise an unsuccessful attempt of a random access transmission.

* * * * *